United States Patent [19]
Georgis et al.

[11] Patent Number: 5,369,285
[45] Date of Patent: Nov. 29, 1994

[54] METHOD AND APPARATUS FOR OPTICAL DETECTION OF CLEANING MEDIUM IN AN INFORMATION STORAGE DRIVE

[75] Inventors: Steven P. Georgis; Robert Sugar, both of Boulder; Rodney Brittner; Thomas D. Fox, both of Longmont, all of Colo.

[73] Assignee: Exabyte Corporation, Boulder, Colo.

[21] Appl. No.: 164,762

[22] Filed: Dec. 10, 1993

Related U.S. Application Data

[63] Continuation of Ser. No. 933,824, Aug. 24, 1992, abandoned.

[51] Int. Cl.⁵ .................. G01N 21/86; G01V 9/04
[52] U.S. Cl. ........................... 250/561; 356/443
[58] Field of Search ............. 250/559, 561, 571, 205; 356/433, 435, 443, 429; 360/128, 77.03, 74.6

[56] References Cited

U.S. PATENT DOCUMENTS

| | | | |
|---|---|---|---|
| 3,566,132 | 2/1971 | Walker | 250/559 |
| 3,838,291 | 9/1974 | Marion et al. | 250/571 |
| 4,734,807 | 3/1989 | Duley | 360/128 |
| 4,820,125 | 4/1989 | Keiter et al. | 250/561 |
| 4,835,638 | 5/1989 | Takeda | 360/99.02 |
| 4,843,495 | 6/1989 | Georgis et al. | 360/77.15 |
| 4,845,577 | 7/1989 | Georgis et al. | 360/72.2 |
| 4,848,698 | 7/1989 | Newell et al. | 360/74.6 |
| 4,946,282 | 8/1990 | Task | 356/443 |
| 5,047,652 | 9/1991 | Lisnyansky et al. | 356/429 |
| 5,068,757 | 11/1991 | Hughes et al. | 360/77.13 |
| 5,216,258 | 6/1993 | McConnell | 356/434 |
| 5,294,791 | 3/1994 | Pahr | 360/77.03 |

*Primary Examiner*—David C. Nelms
*Assistant Examiner*—Stephone B. Allen
*Attorney, Agent, or Firm*—Nixon & Vanderhye

[57] ABSTRACT

A system (20) and method for identification of medium (41) inserted into an information storage drive optically determines whether the medium is cleaning medium by determining the translucency of the medium. The system includes a dual infra-red LED light source (28) having a controllable intensity as well as BOT and EOT light receivers (30, 32). The medium longitudinally extends between the light source and the light receivers. A medium identification controller (48) determines the type of medium inserted into the information storage drive by progressively ramping the intensity of the light source and determining at what effective driving signal value the light receivers actually receive light through the medium, and by comparing the effective driving signal value for each receiver with a calibrated driving signal value at which the light receiver actually receives light when no medium is inserted.

19 Claims, 4 Drawing Sheets

METHOD AND APPARATUS FOR OPTICAL DETECTION OF CLEANING MEDIUM IN AN INFORMATION STORAGE DRIVE

This is a continuation of application Ser. No. 07/933,824, filed Aug. 24, 1992, now abandoned.

BACKGROUND

1. Field of Invention

This invention pertains to method and apparatus for identifying media placed in an information storage drive, such as a magnetic tape drive, and particularly for identifying when a cleaning cartridge is inserted into a magnetic tape drive.

2. Prior Art and Other Considerations

Information storage drives, such as magnetic tape drives, generally have a supply spindle and a take-up spindle upon which are mounted a supply reel and a take-up reel, respectively, of a medium such as magnetic tape. In a forward mode of operation, the medium travels from the supply reel past one or more transducer heads to the take-up reel. The transducer heads generally write information on the medium or read information written on the medium.

In recent years, some types of information storage drives have been built to utilize magnetic tape cartridges. Examples of cartridge-utilizing drives are the 8 mm drives produced by Exabyte Corporation such as models EXB-8200 and EXB-8500. The cartridges utilized by these drives have magnetic recording tape extending between a supply reel and a take-up reel. When a cartridge is initially inserted into the drive, several actions occur. For example, the reels of the cartridge fit over respective spindles (or hubs) of the drive. A dual infra-red LED of the drive extends through a central aperture of the cartridge. Also, a front cover of the cartridge is opened to expose the medium. Ultimately, when the drive tape path is loaded, a portion of the medium extending between the reels is pulled out of the cartridge and wrapped around and a drum and tape guides. The drum either reads or writes helical tracks of information on the tape. Examples of helical scan magnetic recording technology are shown in U.S. Pat. Nos. 4,843,495; 4,835,638; 4,845,577; and, 5,068,757, all of which are incorporated herein by reference.

The magnetic tape extending between the supply and take-up reels of the aforedescribed cartridges have beginning of tape (BOT) and end of tape (EOT) leaders provided at the linear extremities thereof. The BOT and EOT leaders are transparent, whereas the remainder of the magnetic tape is opaque.

As mentioned above, a dual infra-red LED is centrally provided in the drive and extends into the interior of the cartridge upon insertion. The dual infrared LED directs infra-red light in a first direction toward a first window provided in the cartridge. The infra-red LED also directs light in a second direction (which is about 180° opposite the first direction) toward a second window of the cartridge. The first window is aligned with a EOT photo transistor mounted in the deck, and the second tape window is likewise aligned with an BOT photo transistor in the deck.

Upon leaving the supply reel, the tape travels between the dual infra-red LED and the EOT photo transistor situated to receive light directed in the first direction. Before entering the take-up reel, the tape travels between the dual infra-red LED and the BOT photo transistor situated to receive light directed in the second direction. Each photo transistor conducts when a transparent leader of the tape is present between the LED and the photo transistor.

The transducer heads of drives become soiled by the magnetic media travelling therepast and must periodically be cleaned. To this end, specialized cleaning cartridges have been developed which are insertable into the drive in the same manner as magnetic tape cartridges, but which have a cleaning medium rather than magnetic tape medium extending from a supply reel to a take-up reel. The cleaning medium travels past the heads for removing debris which may have accumulated on the heads. In most cleaning cartridges, the amount of cleaning medium extending between the supply reel and the take-up reel is significantly less than the amount of magnetic tape provided in a standard tape cartridge, such as a 8 mm cartridge.

A drive must detect the presence of a cleaning cartridge inserted therein in order not to write on or attempt to read the cleaning medium. In this regard, in view of the lesser amount of cleaning medium provided in a cleaning cartridge, drives such as the models EXB-8200 and EXB-8500 referenced above heretofore attempted to ascertain the presence of a cleaning cartridge inserted therein by calculating the "area constant" of the medium in the cartridge. This calculation requires loading the medium in the tape path of the drive and advancing the medium a considerable distance from the supply reel to the take-up reel in order to determine the radii of the tape pack on each reel. If the "area constant" is in a predetermined relatively small range, the drive determines that the cartridge inserted therein is a cleaning cartridge.

The "area constant" calculation method requires that the length of medium in cleaning cartridges be held to tight tolerances. However, the sizes of cleaning cartridges are not necessarily standardized, with the result that some cleaning cartridges can be mistaken for data cartridges.

Moreover, the "area constant" method for identifying a cleaning cartridge requires a fairly consequential degree of media travel before the drive obtains enough sampling information to attempt the identification. This sampling requires time which otherwise could be put to more productive use.

Further, the "area constant" method often results in drum stall problems and repeated use at EOT.

Accordingly, it is an object of the present invention to provide an efficient and effective method and apparatus for identifying a cleaning cartridge inserted in a information storage drive.

An advantage of the present invention is the provision of method and apparatus for identifying the presence of a cleaning cartridge in an information storage drive without having to calculate the area constant of the medium in the cartridge.

Another advantage of the present invention is the provision of method and apparatus for identifying the presence of a cleaning cartridge in an information storage drive without having to load the tape path of the drive.

Yet another advantage of the present invention is the provision of method and apparatus for identifying the presence of a cleaning cartridge in an information storage drive by using pre-existing optical and electronic elements.

A further advantage of the present invention is the provision of method and apparatus which identifies a cleaning cartridge in an information storage drive regardless of the length of medium contained in the cartridge.

SUMMARY

A system and method for identification of medium inserted into an information storage drive optically determines whether the medium is cleaning medium by determining the translucency of the medium. The system includes a dual infra-red LED light source having a controllable intensity as well as BOT and EOT light receivers. The medium extends between the light source and the light receivers. A medium identification controller determines the type of medium inserted into the information storage drive by progressively ramping the intensity of the light source and determining at what effective driving signal value the light receivers actually receive light through the medium, and by comparing the effective driving signal value for each receiver with a calibrated driving signal value at which the light receiver actually receives light when no medium is inserted.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
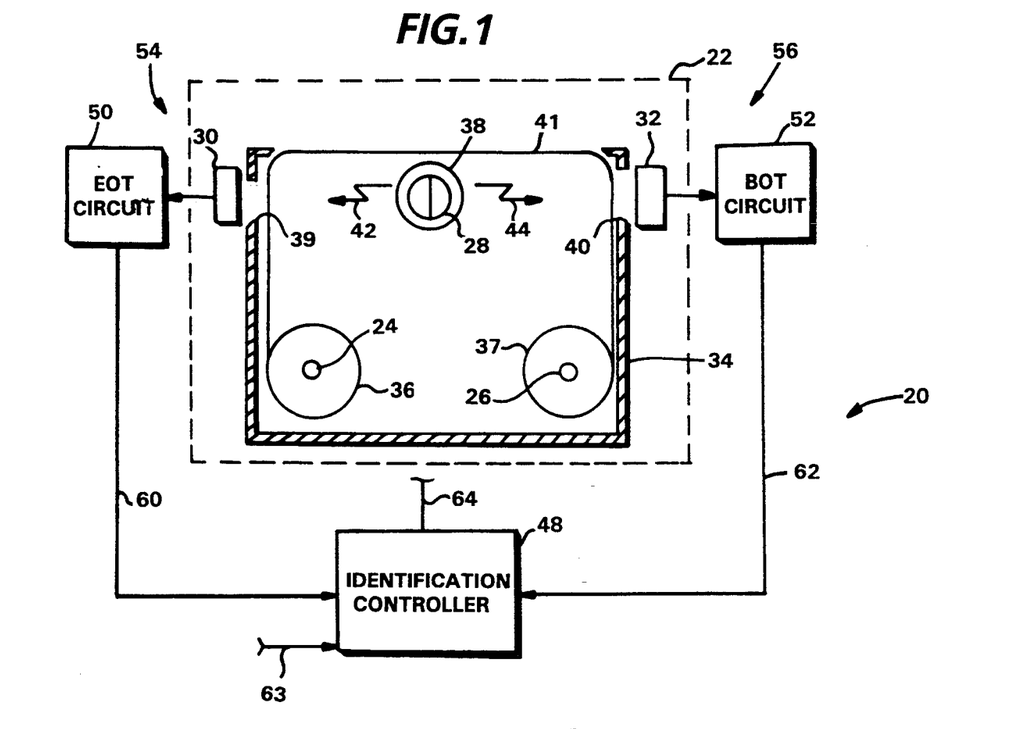
FIG. 1 is schematic view, partially sectioned, of a medium detection and identification system according to an embodiment of the invention.

FIG. 1 shows a medium detection and identification system 20 illustratively employed in an information storage drive such as a magnetic tape drive which receives tape cartridges. The tape drive includes a tape transport deck indicated by broken line 22. The tape transport deck is shown as including a supply reel spindle 24; a take-up reel spindle 26; a light source such as dual infra-red LED 28; and, light receivers such as an end of tape (EOT) photo transistor 30 and a beginning of tape (BOT) photo transistor 32. FIG. 1 also shows (sectioned) a cartridge 34 inserted into the tape transport deck 22. FIG. 1 shows the cartridge 34 in a "cartridge in" or "CARTIN" position with a (unillustrated) front door of the cartridge 34 opened. The cartridge 34 has a supply reel 36 and a take-up reel 37. Upon insertion into the CARTIN position, the supply reel 36 is mounted on the deck supply spindle 24, while the take-up reel 37 is mounted on the deck take-up spindle 26. Also, the LED 28 extends upwardly through an aperture 38 provided in the surface of the cartridge 34 which lies on the deck 22. The cartridge 34 also has windows 39 and 40 aligned with the LED 28. A medium 41 extends from the supply reel 36 to the take-up reel 37. In the illustrated embodiment, the tape transport deck 22 is configured to accept cartridges of a type specified by ANSI Standard Document ANSI/ISO/IEC 11319 entitled "Helical-Scan Digital Computer Tape Cartridge 8 mm (0.315 in) For Information Exchange."

Although not shown in FIG. 1, it should be understood that the tape drive includes one or more heads for writing to and reading from the medium 41. In the embodiment under discussion, read and write heads are mounted on a drum provided at the rear of the tape transport deck 22 (to the north of the LED 28 as shown in FIG. 1) to provide a helical stripe recording system. Examples of such drums are included in Exabyte Corporation tape drive models EXB-8200 and EXB-8500.

Advantageously, the present invention does not require read or write operations. Accordingly, the path taken by the medium 41 as shown in FIG. 1 is that of the cartridge insertion or CARTIN position, and not that of the loading path wherein the medium 41 is placed in contact with the read/write heads. The path taken by the medium 41 for operation of the present invention need only extend between the LED 28 and the EOT photo transistor 30 on the left side of the deck and the LED 28 and the BOT photo transistor 32 on the right side of the deck.

Thus, according to conventional practice, the dual infra-red LED 28 is centrally provided on the transport deck 22 for directing infra-red light in a first direction (shown by arrow 42) toward the window 39 (and accordingly toward medium 41 just leaving the supply reel 36 of cartridge 34). The infra-red LED 28 also directs light in a second direction (depicted by arrow 44) toward window 40 (and accordingly toward medium 41 just about to enter the take-up reel 37). As is seen in FIG. 1, the second direction 44 is about 180° opposite the first direction 42. Accordingly, the medium 41 extends between the dual infra-red LED 28 and the EOT photo transistor 30 situated to receive light directed in the first direction 42. The medium 41 also extends between the dual infra-red LED 28 and the BOT photo transistor 32 situated to receive light directed in the second direction 44.

The detection and identification system 20 includes means for determining the translucency of the medium 41 and a medium identification controller 48. In the illustrated embodiment, the identification controller 48 is a microprocessor which executes a set of prestored instructions to perform a calibration routine and an identification routine as hereinafter discussed. The translucency determination system particularly includes the LED 28; the EOT photo transistor 30; an EOT signal conditioning circuit 50; the BOT photo transistor 32; and, a BOT signal conditioning circuit 52. Thus, the EOT photo transistor 30 and the EOT conditioning circuit 50 comprise an EOT sensor 54 and the BOT transistor 32 and the BOT conditioning circuit 52 comprise a BOT sensor 56.

The EOT signal conditioning circuit 50 and the BOT signal conditioning circuit 52 are connected by lines 60 and 62 to input ports of the identification controller 48. The controller 48 also receives a signal on line 63 whenever a cartridge is about to be loaded onto the transport deck 22. In this respect, conventional drives include a cartridge insertion sensor for sensing imminent insertion of a cartridge. Although unillustrated, it should be understood that the other end of line 63 is connected to the cartridge insertion sensor.

Figure 2:
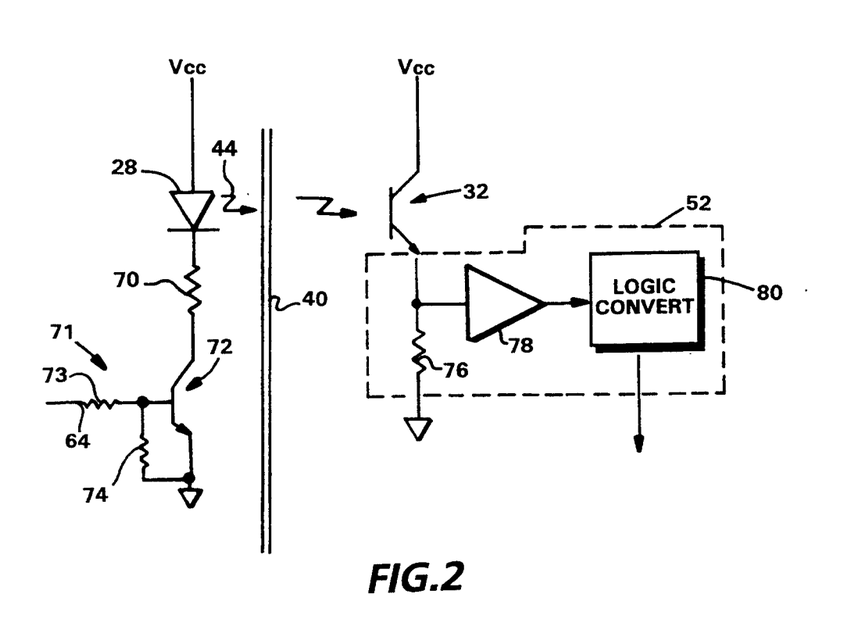
FIG. 2 is a schematic view showing a light source and signal conditioning circuitry according to the system of the embodiment of FIG. 1.

A pulse width modulation (PWM) output port of the controller 48 is connected by line 64 to driving circuitry for the LED 28 (shown in FIG. 2). In this respect, the LED 28 is connected in series (between Vcc and ground) with a resistor 70 and a digital transistor 71. The digital transistor 71 includes an NPN transistor 72 having a base resistor 73 and a base-emitter resistor 74. Line 64 from the PWM output port of the controller 48 is connected to the base resistor of the digital transistor 71. The digital transistor 71 switches on and off in response to the PWM output signal from the controller 48 to modulate the current through the LED 28 at the PWM frequency. This modulation controls the average light intensity of the LED in direct proportion to the PWM duty cycle.

FIG. 2 further shows the BOT conditioning circuit 52 connected to the BOT photo transistor 32. The photo transistor 32 is connected in series (between Vcc and ground) with a resistor 76, the emitter of the photo transistor 32 being connected to the resistor 76. Also connected to the emitter of the photo transistor 32 is an amplifier 78. When the amplified signal from amplifier 78 reaches a predetermined threshold, the logic converter 80 switches its output signal to the controller 48 from an OFF to an ON output signal (which is indicative of light reception at the photo transistor 32).

Although not specifically shown, it should be understood that the EOT photo transistor 30 is similarly driven in the manner of the BOT photo transistor 32. It should further be understood that the EOT conditioning circuit likewise includes a resistor, amplifier, and logic converter configured and connected in the manner of FIG. 2 for applying an on/off output signal indicative of light received at photo transistor 30 to controller 48 on line 60.

In operation, the system 20 determines whether the particular medium 41 housed in cartridge 34 is a cleaning medium or a recording medium, i.e., whether the cartridge 34 is a cleaning cartridge or a conventional data cartridge. In addition, the controller 48 can determine whether the portion of the medium off the reels is a BOT leader, an EOT leader, or some medium portion therebetween. The operation of the system is premised on the fact that cleaning medium is generally translucent at the wavelength of the infra-red LED; the magnetic recording medium (e.g., tape) is completely opaque; and the clear leaders are almost perfectly transparent. Thus, the system 20 discriminates between the clear, opaque, and semi-translucent conditions.

Just prior to insertion of a cartridge 34, the controller 48 executes a calibration routine. After the cartridge 34 is inserted to the CARTIN position shown in FIG. 1, the controller 48 executes an identification routine. Steps included in a calibration routine of an illustrative embodiment are shown in FIG. 3, while steps included in an identification routine for an illustrative embodiment are shown in FIGS. 4A and 4B.

Both the calibration routine and the identification routine involve adjustment of a signal LED_DUTY_CYCLE. The signal LED_DUTY_CYCLE is utilized in pulse width modulation driving of the dual infra-red LED 28. In particular, the greater the value of signal LED_DUTY_CYCLE applied to the digital transistor 71, the greater the intensity of the LED 28.

Figure 3:
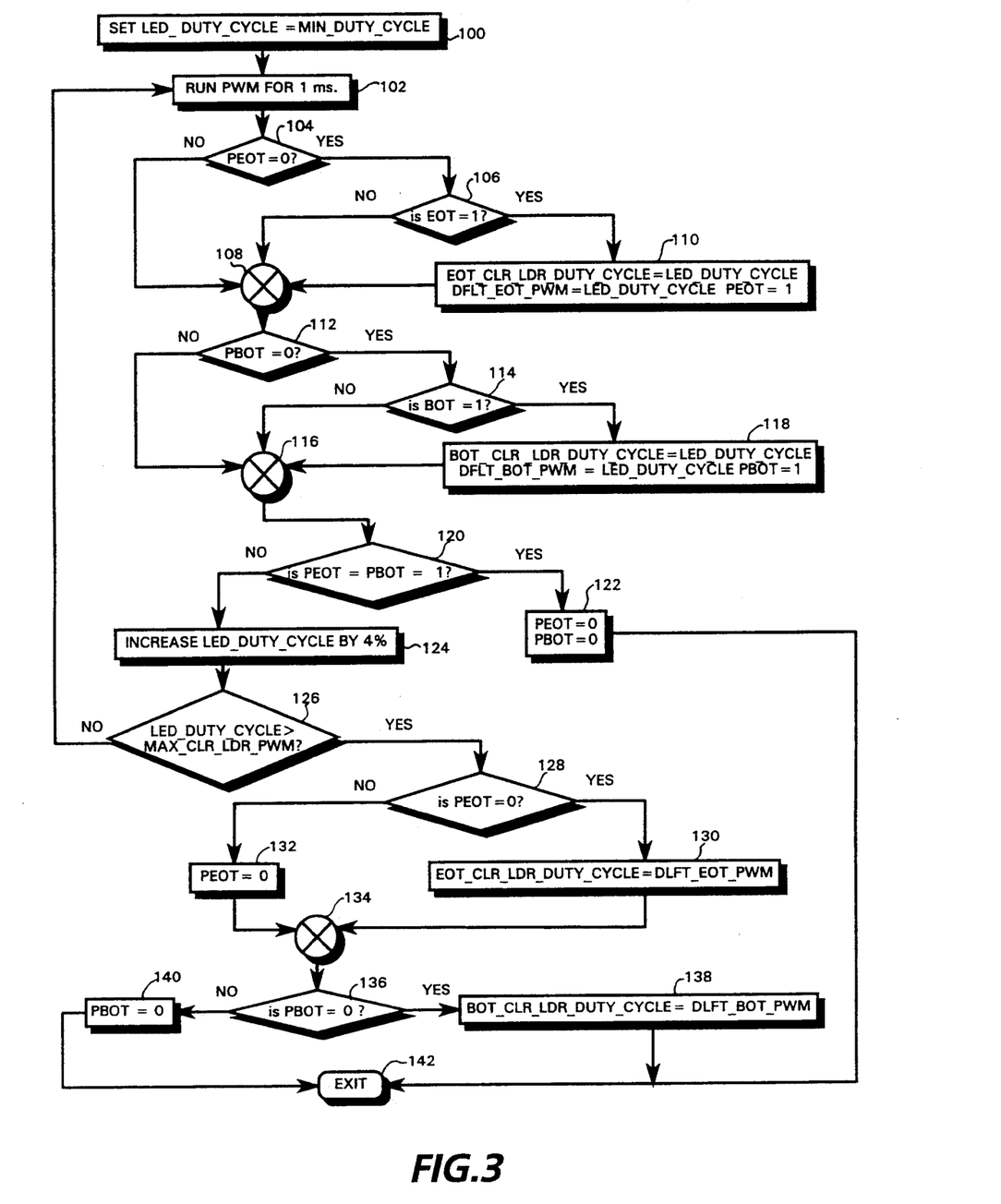
FIG. 3 is a schematic view of steps executed in connection with calibration of the system of the embodiment of FIG. 1.
Figure 4A:
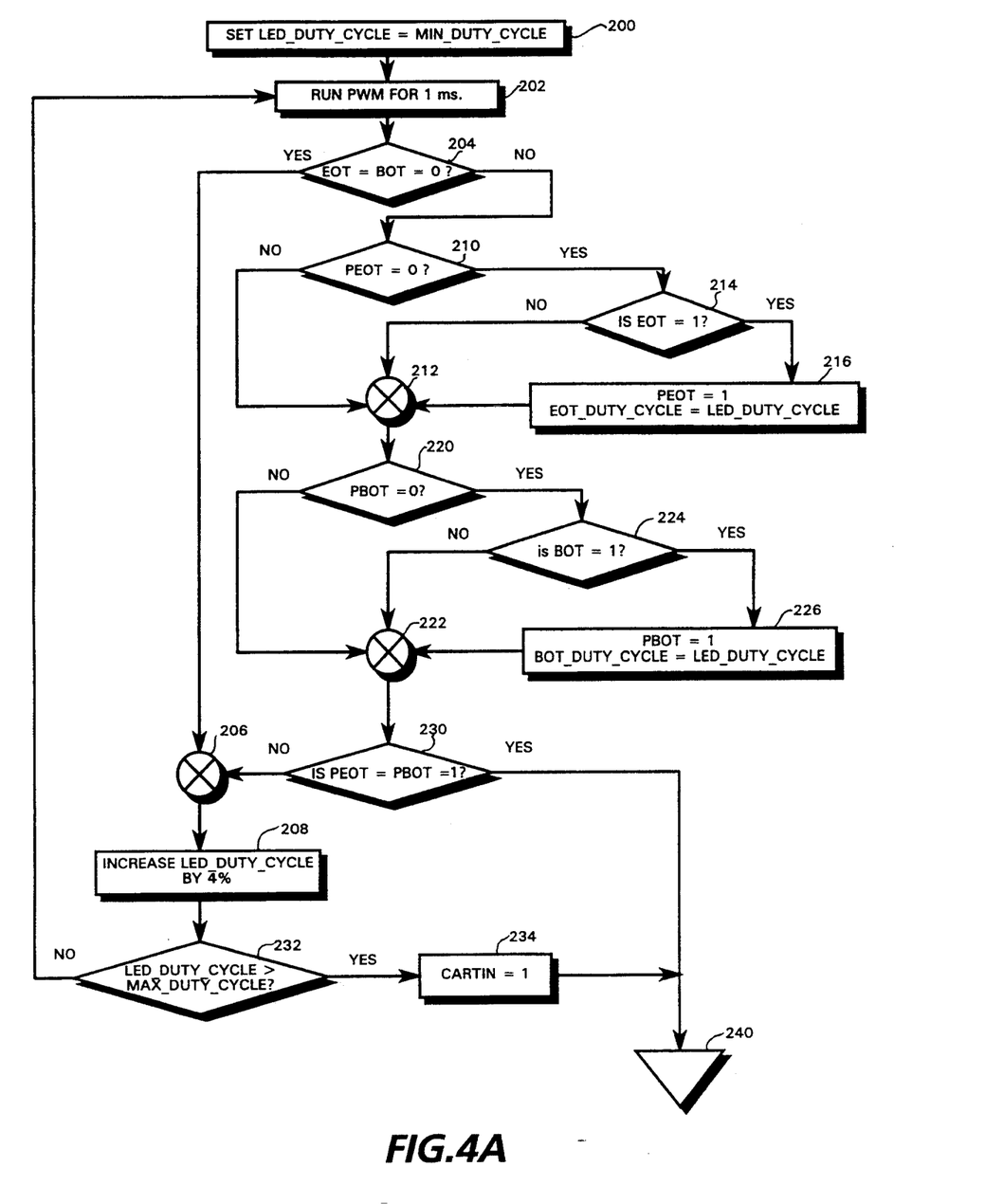
FIGS. 4A and 4B are schematic views of steps executed by the system of the embodiment of FIG. 1 in connection with identification of medium.
Figure 4B:
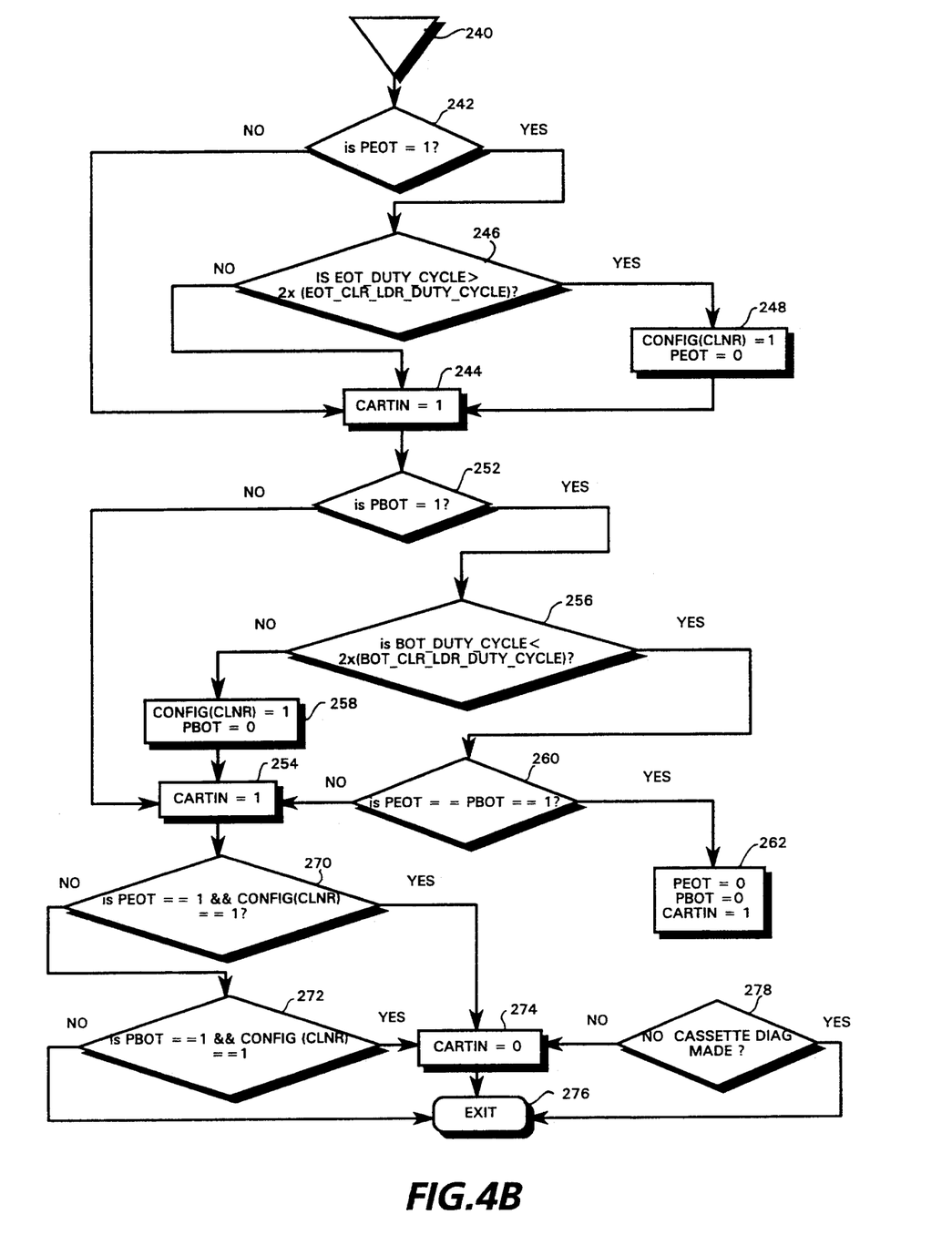

In the calibration routine of FIG. 3, execution begins at step 100 with the signal LED_DUTY_CYCLE being set equal to a minimum value (i.e., MIN_DUTY_CYCLE). As indicated by step 102, for one millisecond the controller 48 outputs on line 64 a PWM signal of magnitude equal to signal LED DUTY CYCLE. At step 104, the controller 48 checks to determine if a flag PEOT=0. Upon the beginning of execution, PEOT will be 0, with the result that step 106 will be executed. Otherwise, execution would jump to a location denoted by symbol 108.

At step 106 the controller 48 checks to determine whether the signal on line 60 from the EOT conditioning circuitry 50 indicates that the EOT sensor 54 has seen the light emanating from the LED 28. If the EOT sensor 54 has been triggered upon detection of light from the LED 28, execution continues at step 110. Otherwise, execution jumps to the location denoted by symbol 108.

At step 110, a signal calibration value EOT_CLR_LDR_DUTY_CYCLE (the duty cycle for a clear leader at end of tape) is set equal to the signal LED_DUTY_CYCLE. In addition, a signal DFLT_EOT_PWM (default end of tape PWM) is set equal to the signal LED_DUTY_CYCLE. Finally, the flag PEOT is set equal to 1. At the location identified by symbol 108 execution continues at step 112.

The execution of steps 112-118 are understood with reference to analogous steps 104-110, keeping in mind that steps 112 concern beginning of tape detection rather than end of tape detection. In particular, at step 114 the controller 48 checks to determine whether the signal on line 62 from the BOT conditioning circuitry 52 indicates that the BOT sensor 56 has seen the light emanating from the LED 28. If the BOT sensor 56 has been triggered upon detection of light from the LED 28, at step 118 a signal calibration value BOT_CLR_LDR_DUTY_CYCLE (the duty cycle for a clear leader at beginning of tape) is set equal to the signal LED_DUTY_CYCLE. In addition, a signal DFLT_BOT_PWM (default beginning of tape PWM) is set equal to the signal LED_DUTY_CYCLE. Finally, the flag PBOT is set equal to 1. At the location identified by symbol 116, reached either from step 112, step 114, or step 118, execution continues at step 120.

At step 120 the controller 48 checks to determine if the BOT sensor 56 and the EOT sensor 54 have both been triggered. If so, the flags PEOT and PBOT are reinitialized to 0 (at step 122) before the calibration routine is exited. If not, at step 124 the controller 48 increases the magnitude of the signal LED_DUTY_CYCLE by 4%. Then, as long as the value of signal LED_DUTY_CYCLE is no greater than a maximum (step 126), the controller loops back to step 102 to apply the new value for signal LED_DUTY_CYCLE on line 64 for one millisecond and to repeat appropriate ones of the steps 104-120.

If, as determined at step 126, the loop of increasing the PWM is executed so many times that the signal LED_DUTY_CYCLE exceeds a maximum (i.e., MAX_CLR_LDR_PWM<maximum clear leader PWM), the controller determines which sensors were not triggered and, for the non-triggered sensors, assigns a default PWM value. For example, if the EOT sensor remains untriggered (determined at step 128 by checking flag PEOT), the signal EOT_CLR_LDR_DUTY_CYCLE (the duty cycle for a clear leader at end of tape) is set equal to the default signal DFLT_EOT_PWM (step 130). Otherwise the flag PEOT is reinitialized at 0 (step 132). If the BOT sensor remains untriggered (determined at step 136 by checking flag PBOT), the signal BOT_CLR_LDR_DUTY_CYCLE (the duty cycle for a clear leader at beginning of tape) is set equal to the default signal DFLT_BOT_PWM (step 138). Otherwise the flag PEOT is reinitialized at 0 (step 140).

The calibration routine of FIG. 3 is exited after execution of step 122, step 138, or step 140.

After execution of the calibration routine, and when the cartridge 34 is in the CARTIN position shown in FIG. 1, the controller 48 commences execution of the identification routine illustrated with reference to FIGS. 4A and 4B. Initially, at step 200 the controller 48 sets the value of the signal LED_DUTY_CYCLE equal to a predetermined minimum value (signal MIN_DUTY_CYCLE). Then, at step 202 (similar to step 102 of the calibration routine), the controller applies the value of the signal LED_DUTY_CYCLE on line 64 to the driving circuit of LED 28 for one millisecond.

At step 204 the controller 48 examines the signals received on line 62 from the BOT sensor 56 and on line 60 from the EOT sensor 54. If the BOT sensor 56 is triggered by light from the LED 28, the controller 48 sets a flag PBOT equal to 1. Likewise, if the EOT sensor 54 is triggered by light from the LED 28, the controller 48 sets a flag PEOT equal to 1. If, at step 204, the controller 48 determines that neither flag PBOT or PEOT have been set to 1 (i.e., neither sensor has triggered), execution jumps to the location denoted by symbol 206, and then to step 208.

If either the BOT or EOT sensors have triggered, at step 210 the controller checks the value of flag PEOT. Initially, the flag PEOT should be 0 (having been reinitialized upon exit from the calibration routine as described above). If flag PEOT is not 0, execution jumps to the location denoted by symbol 212.

If the flag PEOT has the value 0, the controller 48 checks the EOT signal to determine whether the EOT sensor 54 was triggered. If not, execution jumps to the location denoted by symbol 212. If the EOT sensor 54 was triggered, at step 216 the controller 48 sets the flag PEOT to 1 and loads the value of the signal LED_DUTY_CYCLE into a variable EOT_DUTY_CYCLE, before jumping to the location denoted by symbol 212. That is, at step 216 the controller 48 stores in variable EOT_DUTY_CYCLE a value corresponding to the intensity of the LED 28 at which light from the LED 28 penetrates the medium 41 interposed between the LED 28 and the EOT sensor 54. This variable EOT_DUTY_CYCLE thus becomes the effective driving signal value at which the EOT sensor 54 actually receives light from the LED 28.

From the location of symbol 212 the controller 48 executes decision step 220 and subsequently one or more of the associated steps 222 or 224 and 226. Steps 220–226 are the BOT analogues of the EOT steps 210–216 described above, and are understood with reference thereto. Detailed explanation of steps 220–226 accordingly is not provided. It is sufficient to state that, if the BOT sensor 56 were triggered, at step 226 the controller 48 sets the flag PBOT to 1 and loads the value of the signal LED_DUTY_CYCLE into a variable BOT_DUTY_CYCLE. In other words, at step 226 the controller 48 stores in variable BOT_DUTY_CYCLE a value corresponding to the intensity of the LED 28 at which light from the LED 28 penetrates the medium 41 interposed between the LED 28 and the BOT sensor 56. This variable BOT_DUTY_CYCLE thus becomes the effective driving signal value at which the BOT sensor 56 actually receives light from the LED 28.

At step 230, which follows the location denoted by symbol 222, the controller 48 determines whether both flags PEOT and PBOT have been set to 1. If not, execution continues at the location denoted by symbol 206 and step 208. In particular, at step 208, the value of the signal LED_DUTY_CYCLE is increased by 4%. At step 232, the controller 48 determines whether the value of the signal LED_DUTY_CYCLE exceeds a predetermined maximum (MAX_DUTY_CYCLE). If not, processing jumps back to step 202 whereat the controller 48 applies the new value of signal LED_DUTY_CYCLE on line 64 to the driving circuit for LED 28 and whereat various appropriate aforementioned steps are repeated in loop fashion. If the value of the signal LED_DUTY_CYCLE exceeds the predetermined maximum, at step 234 the controller 48 assigns a flag CARTIN the value 1 before continuing execution at the location denoted by symbol 240. The location denoted by symbol 240 is also reached by an affirmative decision at step 230.

At the location denoted by symbol 240 execution continues with step 242. At step 242 the controller 48 checks the flag PEOT to determine if the EOT sensor 54 was triggered. If the EOT sensor 54 did not trigger, the flag CARTIN is set to the value 1 at step 244. If the EOT sensor 54 did trigger, the controller 48 determines (at step 246) whether the EOT sensor 54 triggered at an LED duty cycle that is less than that required for detection of a cleaning medium. In this respect, if the value of the signal EOT_DUTY_CYCLE (obtained at step 216) is greater than twice the value of the signal EOT_CLR_LDR_DUTY_CYCLE (obtained at calibration step 110), then the controller concludes that a cleaning medium was detected. Upon the detection of cleaning medium, at step 248 a flag CONFIG(CLNR) is set to 1 (to indicate detection of cleaning medium) and the flag PEOT is cleared (set to 0) before execution proceeds to step 244. If the value of the signal EOT_DUTY_CYCLE is not greater than twice the value of the signal EOT_CLR_LDR_DUTY_CYCLE, the controller 48 realizes that the cartridge 34 is at EOT and proceeds to step 244. As indicated above, at step 244 the flag CARTIN is set to the value 1 before proceeding to step 252.

At step 252, the controller 48 checks the flag PBOT to determine if the BOT sensor 56 was triggered. If the BOT sensor 56 did not trigger, the flag CARTIN is set to the value 1 at step 254. If the BOT sensor 56 did trigger, the controller 48 determines (at step 256) whether the BOT sensor 56 triggered at an LED duty cycle that is less than that required for detection of a cleaning medium. In this respect, if the value of the signal BOT_DUTY_CYCLE (obtained at step 226) is less than twice the value of the signal BOT_CLR_LDR_DUTY_CYCLE (obtained at calibration step 118), then the controller concludes that a cleaning medium was not detected. Upon the detection of cleaning medium, at step 258 the flag CONFIG(CLNR) is set to 1 (to indicate detection of cleaning medium) and the flag PBOT is cleared (set to 0) before execution proceeds to step 254. If the value of the signal BOT_DUTY_CYCLE is less than twice the value of the signal BOT_CLR_LDR_DUTY_CYCLE, the controller 48 realizes that the cartridge 34 is at BOT and proceeds to step 260.

At step 260 the controller 48 determines whether both flags PEOT and PBOT have been set to 1 (i.e., whether both EOT sensor 54 and BOT sensor 56 have triggered). If not, processing continues at step 254. Otherwise, at step 262 the controller 48 clears (sets to 0) both flags PEOT and PBOT and sets flag CARTIN to 1.

After executing step 254, the controller 48 checks at step 270 whether the flag PEOT is set to 1 and whether a the flag CONFIG(CLNR) is set to 1. Similarly, at step 272 the controller 48 checks whether the flag PBOT is set to 1 and whether a the flag CONFIG(CLNR) is set to 1. If the determinations at either step 270 or 272 are affirmative, at step 274 the controller 48 sets flag CARTIN at 0 before exiting the identification routine (step 276). Otherwise, the controller 48 merely exits the routine at step 276.

After assigning values to flags PEOT, PBOT, and CARTIN at step 262, the controller 48 determines at step 278 whether it is in a no-cassette diagnostic mode. If the controller 48 is in a diagnostic mode, the identification routine is exited at step 276. Otherwise, the flag CARTIN is reinitialized at 0 (step 274) before exiting.

Thus, summarizing the foregoing calibration operation, at the time a cartridge 34 is about to be inserted into the drive, the LED 28 is shut off and then its driving current is ramped up to gradually increase the intensity of the light produced thereby. The ramping is achieved by pulse-width modulating the on/off control line 64 from the controller 48 at a constant frequency with a pattern of increasing duty cycles. At some threshold level, enough light will reach the photo transistors 30 and 32, which will in turn produce enough current to turn on (switch logic signals) their associated circuits 50 and 52. For each photo transistor 30, 32, the duty cycle which caused the sensor to switch on with nothing in the optical path is stored. With reference to FIGS. 3, 4A, and 4B, these calibration duty cycle values are labeled as BOT_CLR_DUTY_CYCLE and EOT_CLR_DUTY_CYCLE, respectively. For purpose of an ensuing discussion concerning Table 1 below, these calibration duty cycle values are also referred to as $T_{B0}$ and $T_{E0}$, respectively.

When the cartridge 34 is actually inserted into the drive, the identification routine is executed to obtain duty cycle values at which the light intensity of the LED 28 penetrates the medium 41 for triggering the BOT sensor 56 and the EOT sensor 54. With reference to FIGS. 3, 4A, and 4B, these duty cycle values, also referred to as "effective driving signal" values, are labeled as BOT_DUTY_CYCLE and EOT_DUTY_CYCLE, respectively. For purpose of an ensuing discussion concerning Table 1 below, these duty cycle values are also referred to as $T_{B1}$ and $T_{E1}$, respectively.

Thus, in the illustrated and other embodiments, using Table 1 the controller 48 identifies the type and position of the medium in the cartridge 34. In Table 1, reference to "100%" means the maximum possible duty cycle value output by the controller 48.

The invention requires that the values of $T_{B1}$ and $T_{E1}$ be sufficiently different from $T_{B0}$ and $T_{E0}$ that variations due to material translucency do not result in false interpretations. In general, the ratio between $T_{B1}$ or $T_{E1}$ for cleaning medium (e.g., cleaning fabric) is about 5 to 1. When a wet cleaning medium is used, the ratio becomes about 3 to 1.

In using the PWM technique to control the intensity of the LED 28, the frequency of modulation must be sufficient to keep the output current of the photo transistors 30, 32 from switching on and off. In the illustrated embodiment, a frequency of about 19.5 KHz is used.

Advantageously, since the calibration routine is executed immediately before the cartridge is inserted into the drive, any variations due to power supply voltage, operating environment, and aging of components is reflected in the values of $T_{B0}$ and $T_{E0}$. When the values $T_{B0}$ and $T_{B1}$ are compared, or when the values $T_{E0}$ and $T_{E1}$ are compared, such variations are canceled.

As indicated above, the invention advantageously does not require loading of the tape path of the drive. Moreover, the invention advantageously employs pre-existing optical and electronic elements such as the LED 28 and the photo transistors 30 and 32.

While the invention has been particularly shown and described with reference to the preferred embodiments thereof, it will be understood by those skilled in the art that various alterations in form and detail may be made therein without departing from the spirit and scope of the invention. For example, other methods of controlling the intensity of LED 28 are envisioned, such as by using a digital to analog converter, for example. Moreover, other types of photo sensors are used. Neither is the invention confined to the use of any particular type or dimension of medium.

TABLE 1

| MEDIUM TYPE & POSITION | $T_{B1}$ LEVEL | $T_{E1}$ LEVEL |
|---|---|---|
| no medium loaded | $= T_{B0}$ | $= T_{E0}$ |
| data medium at BOT | about equal to $T_{B0}$ | $= 100\%$ |
| data medium between BOT and EOT | $= 100\%$ | $= 100\%$ |
| data medium at EOT | $= 100\%$ | about equal to $T_{E0}$ |
| cleaning medium at BOT | about equal to $T_{B0}$ | $T_{E0} << T_{E1} < 100\%$ |
| cleaning medium between BOT and EOT | $T_{B0} << T_{B1} < 100\%$ | $T_{E0} << T_{E1} < 100\%$ |
| cleaning medium at EOT | $T_{B0} << T_{B1} < 100\%$ | about equal to $T_{E0}$ |

The embodiments of the invention in which an exclusive property or privilege is claimed are defined as follows:

1. Apparatus for detecting a type of medium inserted in an information storage drive, the apparatus comprising:
    an optical device for determining the translucency of a medium inserted into the information storage drive;
    a medium identification controller connected to the translucency determination means for using the translucency determination to determine the type of medium inserted into the information storage drive.

2. The apparatus of claim 1, wherein the optical device comprises a light source and a light receiver between which the medium extends, with the light source having a controllable intensity, the medium identification controller being connected to the light source to apply driving signals of differing values to the light source for controlling the intensity of the light source, the medium identification controller being connected to the light receiver for obtaining a signal indicating that light is received at the light receiver, the medium identification controller determining at what effective driving signal value the light receiver actually receives light when the medium is inserted into the information storage drive and using the effective driving signal value to determine the type of medium inserted into the information storage drive.

3. The apparatus of claim 2, wherein the medium identification controller applies pulse width modulated driving signals to the light source, and uses a value of the pulse width modulated signal which results in actual light reception at the light receiver as an indication of the translucency of the medium.

4. The apparatus of claim 1, wherein the optical device comprises a light source and two light receivers, with the medium extending between the light source and each light receiver, the medium identification controller being connected to the light source to apply driving signals of differing values to the right source for controlling the intensity of the light source, the medium identification controller being connected to the light receivers for obtaining signals indicating that right is received at the respective right receivers, the medium identification controller determining at what effective driving signal values the right receivers actually receive light when the medium is inserted into the information storage drive and using the effective driving signal values to determine the type of medium is inserted into the information storage drive and to determine a position of the medium within the drive.

5. Apparatus for determining a type of medium inserted in an information storage drive, the apparatus comprising:
a light source having a controllable intensity;
a light receiver situated whereby the medium extends between the light source and the light receiver, with the light source having a controllable intensity; and,
medium identification means for determining the type of medium inserted into the information storage drive, the medium identification means being connected to the light source to apply driving signals of differing values to the light source for controlling the intensity of the light source, the medium identification means being connected to the light receiver for obtaining a signal indicating that light is received at the light receiver, the medium identification means determining at what effective driving signal value the light receiver actually receives light when the medium is inserted into the information storage drive and for using the effective driving signal value to identify the medium inserted into the information storage drive.

6. The apparatus of claim 5, wherein the medium identification means compares the effective driving signal value with a driving signal value at which the light receiver actually receives light when no medium is inserted into the information storage medium.

7. Apparatus for determining a type and position of medium contained in a cartridge inserted in an information storage drive, the medium of the cartridge extending between a supply reel and a take-up reel of the cartridge, the apparatus comprising:
a light source having a controllable intensity;
first and second light receivers, the first light receiver being situated whereby medium leaving the supply reel extends between the light source and the first light receiver, the second light receiver being situated whereby medium approaching the take-up reel extends between the light source and the second light receiver, the light source having a controllable intensity; and,
control means for determining the type and position of medium contained in the cartridge, the control means being connected to the light source to apply driving signals of differing values to the light source for controlling the intensity of the light source, the medium identification means being connected to the light receivers for obtaining signals from each receiver indicating that light is received at the respective light receiver, the control means determining at what effective driving signal values the light receivers actually receive light when the medium is inserted into the information storage drive and using the effective driving signal values to identify the medium inserted into the information storage drive and the position of the medium within the cartridge.

8. The apparatus of claim 7, wherein the control means determines whether the medium within the cartridge is at one of a plurality of positions including a beginning of tape position, and end of tape position, or a position intermediate the beginning of tape position and the end of tape position.

9. A method for detecting that a cleaning medium has been inserted in an information storage drive, the method comprising:
determining the translucency of a medium inserted into the information storage drive;
using the translucency determination to determine whether a medium inserted into the information storage drive is a cleaning medium.

10. The method of claim 9, wherein the step of determining the translucency includes:
directing light from a light source to a receiver, with the medium extending between the light source and the receiver;
controlling the intensity of the light source and obtaining an indication of an intensity at which light from the source is actually received at the receiver; and,
using the indication of intensity as a measure of the translucency of the medium.

11. The method of claim 10, wherein controlling the intensity of the light source includes applying driving signals thereto and determining an effective driving signal value at which light from the source is actually received at the receiver.

12. The method of claim 11, wherein the driving signals applied to the light source are pulse width modulated signals, and wherein the pulse width modulation duty cycle of the driving signals are periodically increased until the effective driving signal is determined.

13. The method of claim 11, wherein the step of using the translucency determination to determine whether a medium inserted into the information storage drive is a cleaning medium includes comparing the effective driving signal value at which the receiver actually receives light when the medium is inserted into the information storage drive with a driving signal value at which the receiver actually receives light when the medium is not inserted into the information storage drive.

14. A method for determining a type of medium inserted in an information storage drive, the information storage drive being of the type wherein a light source and a light receiver are respectively situated whereby the medium extends between the light source and the light receiver, the method comprising:
  (1) variably controling the intensity of the light source without medium extending between the light source and the light receiver;
  (2) determining a calibration value indicative of a level of intensity of the light source at which the light receiver receives light from the light source;
  (3) inserting the medium between the light source and the light receiver;
  (4) variably controlling the intensity of the light source with the medium extending between the light source and the light receiver;
  (5) determining an effective value indicative of an intensity level at which the light receiver receives light from the light source with the medium extending between the light source and the light receiver;
  (6) using the determination of step (5) to identify the medium extending between the light source and the light receiver.

15. The method of claim 14, wherein the determinations of steps (2) and (5) are used to identify the medium extending between the light source and the light receiver.

16. The method of claim 14, wherein variably controlling the intensity of the light source includes applying a pulse width modulated signal to means for driving the light source.

17. The method of claim 14, wherein the determination of step (5) includes comparison of:
  (i) an effective driving signal value which drives the light source at an intensity level at which the light receiver receives light from the light source with the medium extending between the light source and the light receiver with
  (ii) a driving signal value which drives the light source at the an intensity level at which the light receiver actually receives light when no medium is inserted between the light source and the light receiver.

18. The method of claim 14, wherein the determinations of steps (2) and (5) are made with respect to light reception at two locations.

19. The method of claim 18, wherein the two reception locations are spaced about the light source at an angle of 180 degrees.

* * * * *